United States Patent [19]

Courduvelis

[11] 3,899,617

[45] Aug. 12, 1975

[54] PROCESS FOR CONDITIONING ABS RESIN SURFACE

[75] Inventor: Constantine I. Courduvelis, Athens, Greece

[73] Assignee: Enthone, Incorporated, West Haven, Conn.

[22] Filed: July 19, 1973

[21] Appl. No.: 380,634

[52] U.S. Cl. ............................ 427/304; 427/322
[51] Int. Cl.² ........................................ B44D 1/18
[58] Field of Search .... 117/47 A, 130 E, 138.8 UA, 117/160 R; 106/1; 204/20, 30, 38 B

[56] References Cited
UNITED STATES PATENTS

| | | | |
|---|---|---|---|
| 2,872,346 | 2/1959 | Miller | 106/1 X |
| 3,286,009 | 11/1966 | Yumoto et al. | 117/7 X |
| 3,403,035 | 9/1968 | Schneble et al. | 106/1 |
| 3,702,285 | 11/1972 | Knorre et al. | 204/30 |
| 3,790,400 | 2/1974 | Kuzmik | 117/47 A |
| 3,817,774 | 6/1974 | Kuzmik | 117/47 A |

*Primary Examiner*—Thomas J. Herbert, Jr.
*Assistant Examiner*—Bruce H. Hess
*Attorney, Agent, or Firm*—R. J. Drew; E. J. Schaffer

[57] ABSTRACT

ABS resin surfaces are etched by contact with a strong acid oxidizing solution, and then post-etched by contact with an alkanol amine aqueous solution. A materially increased adherence of a coating material deposit to the resin surface is thereby attained, and improved thermocycling resistance of defectively molded ABS resin articles is also attained.

14 Claims, No Drawings

PROCESS FOR CONDITIONING ABS RESIN SURFACE

BACKGROUND OF THE INVENTION

1. Field of the Invention

This invention relates to the conditioning of ABS resin surfaces and more especially to post-etchant compositions and processes for conditioning ABS resin surfaces.

2. Description of the Prior Art

It is known in the prior art to subject plastic articles, e.g. ABS plastic articles, to pre-etch treatment with organic solvents, especially high boiling esters, prior to etching to secure better adhesion of the metal plating to the plastic surface as well as better plateability of defectively molded plastic parts. U.S. Pat. No. 3,702,285 discloses treatment of plastics including acrylonitrilebutadienestyrene copolymer, after chromosulfuric acid etching, in an alkaline aqueous solution containing ammonia or compounds other than alkanolamines and having primary, secondary or tertiary amino groups and/or quarternary ammonium compounds. The post-etchant treatment results in the binding in the form of complexes of adhesion-inhibiting metal ions, such as chromium ions, remaining on the plastic surface from the etching treatment. Consequently, improved adhesion of the metal plating is disclosed as attained.

BRIEF SUMMARY OF THE INVENTION

The process for conditioning the ABS resin surfaces in accordance with the present invention, comprises etching the ABS, i.e. acrylonitrite-butadiene-styrene, resin surface by contacting the ABS surface with a strong acid oxidizing solution, and contacting the thus-treated ABS resin surface with an aqueous solution of an alkanolamine for a time sufficient to materially improve the adhesion to the surface of a deposit of coating material, e.g. an electroless metal deposit.

The mechanism involved in the post-etching treatment of this invention is entirely different that that of aforementioned U.S. Pat. No. 3,702,285, and is not concerned, at least not in any significant degree, with binding of metal ions introduced from the etching step. In the post-etching treatment of this invention the alkanolamine of the post-etchant solution reacts with and solubilizes carboxyl group-containing organic resin fragments or pieces of low solubility or insoluble in water and present on the ABS resin surface due to oxidative degradation of the resin surface during the etching, to render the carboxyl group-containing organic fragments more soluble in water. As a result, a major portion, at least, of such carboxyl group-containing fragments or pieces are removed from the ABS surfaces. The carboxyl group-containing resin or polymer fragments resulting from the etching, if permitted to remain on the etched ABS surface, result in lowered or reduced strength adherence of the electroless metal plate to the resin surface.

The alkanolamine utilized herein can be any suitable water-soluble alkanolamine. Exemplary of such soluble alkanolamines are mono-, di- and tri-alkanolamines wherein the alkanol radical contains 2–3 carbon atoms, e.g. monoethanolamine, diethanolamine, monopropanolamine, dipropanolamine, tripropanolamine and triethanolamine.

The concentration of the alkanolamine aqueous solutions of this invention is not especially critical and can be varied over a broad concentration range and ranging from dilute solutions to concentrated solutions. For example, alkanolamine aqueous solutions of alkanolamine concentrations ranging from about 1% by weight to about 50% by weight can be utilized.

The temperature of etching or conditioning is a temperature in the range of room temperature to up to but below an elevated temperature at which the resin substrate softens. The etching time is an inverse function of the temperature of the etchant solution, and hence elevated temperatures of etching result in a faster etching rate than is the case at room temperature. For etching ABS resin surfaces, temperature of the etching solution in the range of about 120° F. to about 160° F. are usually utilized.

For the post-etching or post-conditioning treatment with the alkanol amine solution, temperatures in the range of room temperature to up to but below that elevated temperature at which the ABS resin surface is detrimentally affected, such as by softening, can be utilized. The temperature of the post-etchant solution is usually in the range of about 120° F. to about 160° F. for the post-etching.

The time of etching varies with the temperature of the etching solution, with shorter etching times required at higher temperatures of the etching solution and longer etching times required at lower temperatures and room temperature of the etching solution. At the usual etching temperature within the range of about 120° F. to about 160° F., the etching time will usually be in the range of about 3 minutes to about 10 minutes.

The time required for the post-etching with the alkanol amine solution also varies with the temperature of the post-etchant solution, with shorter post-etching times required with higher temperatures and longer post-etching times required when the alkanol amine post-etchant solution is at a lower temperature or at room temperature. At the usual post-etching temperature within the range of about 120° F. to about 160° F., the post-etching time will usually be in the range of about one-half minute to about 10 minutes.

Prior to etching the plastic surface or surfaces, the surface, unless already clean, is preferably cleaned, for instance by being chemically cleaned by immersion in a conventional non-silicated alkaline cleaner solution.

The plastic surface is etched by contact with, usually by immersing in, the strong acid oxidizing solution at the temperature and for the time previously disclosed herein. Strong acid oxidizing solutions utilizable for the etching step are exemplified by the following:

| Etchant A | |
|---|---|
| $CrO_3$ | 10 oz./gallon |
| $H_2SO_4$ | 32 fl. oz./gallon |

| Etchant B | |
|---|---|
| $K_2Cr_2O_7$ | 15 g. |
| $H_2SO_4$ | 100 ml. |
| $H_2O$ | 50 ml. |

| Etchant C | % by Wt. |
|---|---|
| $H_2SO_4$ | 53.0 |
| $H_3PO_4$ | 22.0 |
| $CrO_3$ | 1.7 |
| $H_2O$ | 23.3 |

The etched polymer surface or surfaces are then post-etched by being contacted with, usually by immersion in, the post-etchant alkanol amine solution at the temperature and for the time previously disclosed herein. Post-etchant solutions of this invention are exemplified by the following:

Example 1

| | % by Wt. |
|---|---|
| Diethanolamine | 10 |
| $H_2O$ | 90 |

Example 2

| | % by Wt. |
|---|---|
| Triethanolamine | 10 |
| $H_2O$ | 90 |

Example 3

| | % by Wt. |
|---|---|
| Monoethanolamine | 3 |
| $H_2O$ | 97 |

Example 4

| | % by Wt. |
|---|---|
| Isopropanolamine | 5 |
| $H_2O$ | 95 |

Example 5

| | % by Wt. |
|---|---|
| Isobutanolamine | 20 |
| $H_2O$ | 80 |

Example 6

| | % by Wt. |
|---|---|
| Diethanolamine | 15 |
| $H_2O$ | 85 |

Example 7

| | % by Wt. |
|---|---|
| Triethanolamine | 30 |
| $H_2O$ | 70 |

After the post-etching treatment, the plastic surface or substrate is rinsed with water.

The thus-treated plastic surface is then activated by either a single step or two step activating. The single step activating can be that disclosed in U.S. Pat. No. 3,011,920 wherein the activator is a colloidal sol with the stannous chloride and palladium chloride being present therein and the ionic palladium being reduced to metallic palladium particles dispersed in the aqueous HCl. The plastic surface is immersed in the colloidal sol activator until activated.

In the case of the two step activating, the plastic surface is sensitized by being contacted with, usually by immersion in, a sensitizer solution. Although not meant to be restrictive, the following solution is a suitable sensitizer:

Sensitizer Solution

| | |
|---|---|
| $SnCl_2$ | 10 g. |
| HCl | 40 ml. |
| $H_2O$ | 1000 ml. |

After sensitizing, the plastic surface is rinsed thoroughly with water.

The sensitized plastic surface is then activated in the two-step activation procedure by being contacted with, usually by immersion in, an activator solution. While not intended to be restrictive, the following solution is a suitable activator:

Activator Solution

| | |
|---|---|
| $PdCl_2$ | 1 g. |
| HCl (A.R. Grade) | 10 ml. |
| $H_2O$ | 1 gallon |

The plastic surface is rinsed thoroughly with water after activation.

The activated plastic surface is then electrolessly metal plated in conventional manner with, for example, copper or nickel, by contacting the activated surface with, usually by immersing the activated surface in a suitable chemical reduction copper or nickel plating solution. Suitable chemical reduction plating baths utilizable herein are those set forth in the article by Dr. E. B. Saubestre entitled "Electroless Plating Today" in Metal Finishing, Vol. 60, 1962, No. 6, pp. 67–73; No. 7, pp. 49–53; No. 8, pp. 45–49; and No. 9, pp. 59–63, but are not intended to be restrictive. The electroless plating is continued until the surface being plated is rendered electrically conductive.

The thus-plated plastic surface or surfaces may then be electroplated in a conventional copper electroplating solution of the acid sulfate, fluoborate or sulfamate type. If the surface or substrate is to have a bright decorative finish, the electroplating bath should contain a brightener or brighteners, which are readily obtainable in commerce. The copper electroplate is usually of about 0.1–1.5 mils thickness.

The copper electroplating is usually followed by a final decorative plating such as, for example, a nickel electroplate over the copper and a chromium electroplate over the nickel electroplate, or a nickel electroplate over the copper and a gold electroplate over the nickel electroplate.

When the single step activating of U.S. Pat. No. 3,011,920 is employed, the surface or surfaces are rinsed thoroughly with water after the activating and preferably then subjected to a solubilizing step to dissolve any insoluble tin salts that may be present on the activated surface. This solubilizing may be effected by immersing the activated surface in an aqueous HCl solution of 20% HCl concentration for about 3 minutes.

DESCRIPTION OF THE PREFERRED EMBODIMENTS

The alkanolamine aqueous solutions of this invention are preferably diluted aqueous solutions of alkanolamine concentration in the range of about 2% to about 10%, percentages being by weight.

Temperature in the range of about 70° F. to about 160° F. is preferred for the post-etching.

Diethanolamine and triethanolamine are the preferred alkanolamines herein.

The following tests were carried out:

TEST A

A plurality of knobs molded of ABS plastic were metal plated in accordance with the following plating cycle:

1. Immersed 6–7 minutes in a sulfuric acid- and chromic acid anhydride-containing aqueous conditioner solution at 140° F. which was air agitated.
2. Rinsed with water.
3. Pressure sprayed with water.
4. Immersed in an aqueous solution of diethanolamine of 10% diethanolamine concentration at a temperature of 130° F. for 5 minutes.
5. Rinsed with water.
6. Immersed 1 minute in a palladium- and tin-containing activator solution at 70° F.
7. Rinsed with water.
8. Rinsed with water.
9. Immersed for 3 minutes in an aqueous HCl solution obtained by mixing 1 volume of HCl (37%) and 4 volumes of $H_2O$.
10. Rinsed with water.
11. Rinsed with water.

12. Immersed for about 10 minutes in an electroless nickel plating solution at 80° F.
13. Rinsed with water.
14. Electroplated with one-half mil of copper in an acid bright copper electroplating bath.
15. Rinsed with water.
16. Electroplated with 0.3 mil of nickel in a bright nickel electroplating bath.
17. Rinsed with water.
18. Electroplated with 0.1 mil of chromium. Knobs immersed in chromium plating bath and the bath agitated for 15 seconds. The electrical current was initially supplied at the cathode at 8 volts. When gassing started, the current was dropped to 4 volts.
19. Rinsed with water.
20. Rinsed with hot water.
21. Dried in air.

All of the metal-plated knobs were 100% free of blisters after the plating cycle and all of such plated knobs passed 4-5 thermal cycles of −20° F. (in a cold box) for 1 hour, then room temperature for 15 minutes, and thereafter 180° F. for 1 hour.

TEST B

A plurality of knobs molded of ABS plastic were also metal plated in accordance with the plating cycle set forth in Test A except that in these tests of Test B, in step 4 of the plating cycle or procedure as set forth in Test A herein the knobs were immersed for 1 minute in an aqueous HCl solution obtained by mixing together 1 volume of HCl (37%) and 4 volumes of water, instead of being immersed in the aqueous diethanolamine solution of Test A, step 4.

Seventy-five percent (75%) of the ABS knobs blistered during the electroless nickel plating, i.e. step 12, in the plating cycle. Such blistering of the metal plate renders the knobs unsatisfactory for commercial sale.

The following tests show the considerable improvement in adhesion of the metal plating to the polymer surface achieved by the alkanolamine post-conditioner in accordance with this invention.

A plurality of panels molded of ABS plastic were metal plated following steps 1 through 14 of the plating cycle set forth in Test A herein. A plurality of panels molded of ABS plastic were also metal plated following steps 1–14 of the plating cycle set forth in Test A herein, except that post-etching step 4 with the diethanolamine solution was omitted and step 5 was also omitted. The results of adhesion tests, i.e. Pull Tests, conducted on the plated panels are set forth in Table 1 which follows:

TABLE 1

| | RACK No. 1 | | | |
|---|---|---|---|---|
| Panel Number: | 1 | 2 | 3 | 4 |
| Post-etching, Minutes | 6 | 9 | 6 | 9 |
| Post-etching with 6% Diethanolamine aqueous solution, Minutes | None | None | 7 | 7 |
| Hot Water (180°F.), Minutes | 2 | 2 | 2 | 2 |
| Fresh Adhesion (lbs. per inch) | 4.5–5.5 | 5.5–6.5 | 11–12 | 9–10.5 |
| After Aging Adhesion (lbs. per inch) | 12–13 | 11.5–12.5 | 16–17 | 15–16 |

| | RACK No. 2 | | |
|---|---|---|---|
| Panel Number: | 5 | 6 | 7 |
| Post-etching with 6% Diethanolamine aqueous solution, Minutes | None | 4 | 4 |
| Hot Water (180°F.), Minutes | None | 4 | 1 |
| Fresh Adhesion (lbs. per inch) | 6–7 | 11–12 | 7–9 |
| After Aging Adhesion (lbs. per inch) | 14–15 | 15 | 15 |

| | RACK No. 3 | | | |
|---|---|---|---|---|
| Panel Number: | 8 | 9 | 10 | 11 |
| Post-etching with 6% Diethanolamine aqueous solution, Minutes | None | None | 2 | 4 |
| Fresh Adhesion (lbs. per inch) | 5–6 | 5–6 | 8–10 | 8–9 |
| After Aging Adhesion (lbs. per inch) | 9.5–11 | 9–10 | 10–13 | 9.5–11 |

| | RACK No. 4 | | | |
|---|---|---|---|---|
| Panel Number: | 12 | 13 | 14 | 15 |
| % Diethanolamine aqueous post-etchant solution | None | 3 | 10 | 3 |
| Adhesion After 2 Hours (lbs. per inch) | 9–10.5 | 10–12 | 13–14 | 10–11.5 |
| Adhesion After One Day (lbs. per inch) | 13–14 | | 13–14 | |

TABLE 1 -Continued

| | RACK No. 5 | | | |
|---|---|---|---|---|
| Panel Number: | 16 | 17 | 18 | 19 |
| Post-etching with 10% Diethanolamine aqueous solution, Minutes | None | 2 | 5 | 8 |
| Fresh Adhesion (lbs. per inch) | 7.5–8.5 | 10–11 | 11–12 | 9–11 |
| After Three Hours, Adhesion (lbs. per inch) | 10–11 | 10–11 | 11–12 | — |
| After Six Days, Adhesion (lbs. per inch) | 10–11 | 10–11 | 11–12 | — |

Panels molded of ABS plastic were also metal plated following steps 1 through 14 of the plating cycle set forth in Test A herein except that a solution of an alkanolamine other than diethanolamine was utilized in post-etching step 4; and panels molded of ABS plastic were also metal plated following steps 1–14 of the plating cycle set forth in Test A herein except that the post-etching step 4 and step 5 were omitted. The results of adhesion tests, i.e. Pull Tests, conducted on the plated panels are set forth hereinafter in Table 2:

TABLE 2

| | RACK No. 1 | |
|---|---|---|
| Panel Number: | 20 | 21 |
| Post-etching with 6% Monoethanolamine aqueous solution, Minutes | None | 5 Mins. |
| Fresh Adhesion | 3 | 5.5–6 |
| After Aging Adhesion | 8–9 | 11–13 |

| | RACK No. 2 | |
|---|---|---|
| Panel Number: | 22 | 23 |
| Post-etching with 6% Monoethanolamine aqueous solution, Minutes | None | 5 Mins. |
| Fresh Adhesion | 5.5–6 | 8–10 |
| After Aging Adhesion | 8–9 | 10–11 |

| | RACK No. 3 | |
|---|---|---|
| Panel Number: | 24 (2 panels) | 25 (2 panels) |
| Post-etching with 6% Triethanolamine aqueous solution, Minutes | None | 5 Mins. |
| Fresh Adhesion | 6–7, 6–7 | 9–10, 9–11 |

The considerable improvement in adhesion of the metal plate to the ABS surface achieved by the alkanolamine solution post-conditioning in accordance with this invention, is shown by the test results of foregoing Tables 1 and 2. In Tables 1 and 2, the adhesion immediately after plating, i.e. "Fresh Adhesion", is normally 40–70% of the ultimate adhesion achieved after aging the plate, i.e. "After Aging Adhesion", for one day at room temperature or two hours at 165° F. The Fresh Adhesion of the plate to the ABS was increased considerably when the alkanolamine post-etching step was included in the cycle, as is shown by the test data of Tables 1 and 2.

A plurality of television besels molded of ABS plastic were metal plated following the plating cycle previously set forth herein Test A and involving the post-etching treatment with the diethanolamine solution in step 4. None of the metal plated besels developed blisters at the end of the plating cycle. A plurality of television besels molded of ABS plastic were also metal plated following the standard plating cycle which was the same as that set forth in Test A herein except that in step 4 the besels were immersed for 1 minute in an aqueous HCl solution obtained by mixing together 1 volume of HCl (37%) and 4 volumes of water, instead of being immersed in the diethanolamine solution. An estimated 50% of the metal plated besels plated by the standard plating cycle not employing the diethanolamine solution as post-etchant, developed blisters at the end of the plating cycle.

What is claimed is:

1. A process for conditioning surfaces of acrylonitrile-butadiene-styrene copolymers which comprises etching the acrylonitrile-butadiene-styrene copolymer surface by contacting the surface with a strong acid oxidizing solution at a temperature in the range of room temperature to up to but below the softening temperature of the acrylonitrile-butadiene-styrene copolymer, and contacting the thus-etched acrylonitrile-butadiene-styrene copolymer surface with an aqueous solution of a soluble alkanol amine wherein the alkanol radical contains from 2 to 3 carbon atoms at a temperature in the range of room temperature up to but below the softening temperature of the acrylonitrile-butadiene-styrene copolymer for a time sufficient to materially improve adhesion to said surface of electrolessly deposited metal, the aqueous alkanolamine solution having an alkanolamine concentration of from about 1% to about 50% by weight.

2. The process of claim 1 wherein the alkanol amine solubilizes carboxyl group-containing organic resin fragments present on the ABS resin surface due to oxidative degradation of the resin surface during the etching.

3. The process of claim 2 wherein the alkanol amine is a polyalkanol amine, the etching time being shorter at higher temperature of the acid oxidizing etching solution and being longer at lower temperature and room temperature of the acid oxidizing etching solution, the alkanol amine solution treatment time being shorter at higher temperature of the alkanol amine solution and being longer at lower temperature or room temperature of the alkanol amine solution.

4. The process of claim 2 wherein the thus-conditioned resin surface is activated and electrolessly metal plated.

5. The process of claim 3 wherein the thus-conditioned resin surface is activated and electrolessly metal plated.

6. The process of claim 3 wherein the polyalkanol amine is diethanolamine.

7. The process of claim 3 wherein the polyalkanol amine is triethanolamine.

8. The process of claim 2 wherein the alkanol amine is monoethanolamine.

9. The process of claim 2 wherein the alkanol amine is monopropanolamine.

10. The process of claim 3 wherein the polyalkanol amine is tripropanolamine.

11. The process of claim 3 wherein the post-etching contacting of the etched resin surface with the polyalkanol amine solution is conducted at a solution temperature in the range of about 120° F. to about 160° F.

12. The process of claim 1 wherein the strong acid oxidizing solution is a sulfuric acid- and chromic acid-containing solution.

13. The process of claim 2 wherein the strong acid oxidizing solution is a sulfuric acid- and chromic acid-containing solution.

14. The process of claim 2 wherein the etching time and alkanol amine solution treatment time each vary inversely with the temperature.

* * * * *